United States Patent
Nakagawa et al.

(10) Patent No.: US 9,261,706 B2
(45) Date of Patent: Feb. 16, 2016

(54) DISPLAY DEVICE, DISPLAY METHOD AND COMPUTER PROGRAM

(75) Inventors: Makoto Nakagawa, Tokyo (JP); Yuji Nakahata, Kanagawa (JP)

(73) Assignee: Sony Corporation (JP)

( * ) Notice: Subject to any disclaimer, the term of this patent is extended or adjusted under 35 U.S.C. 154(b) by 506 days.

(21) Appl. No.: 12/928,225

(22) Filed: Dec. 7, 2010

(65) Prior Publication Data

US 2011/0141356 A1    Jun. 16, 2011

(30) Foreign Application Priority Data

Dec. 14, 2009  (JP) ................................ P2009-283185

(51) Int. Cl.
*G02B 27/22* (2006.01)
*H04N 13/04* (2006.01)

(52) U.S. Cl.
CPC ........ *G02B 27/2264* (2013.01); *H04N 13/0438* (2013.01); *H04N 13/0497* (2013.01)

(58) Field of Classification Search
None
See application file for complete search history.

(56) References Cited

U.S. PATENT DOCUMENTS

| | | | | |
|---|---|---|---|---|
| 6,549,240 B1 * | 4/2003 | Reitmeier | ............. | G06T 7/2013 348/445 |
| 7,068,241 B2 | 6/2006 | Sato et al. | | |
| 2003/0091114 A1* | 5/2003 | Vissers et al. | ............ | 375/240.16 |
| 2004/0041751 A1* | 3/2004 | Takahashi | ....................... | 345/76 |
| 2005/0078069 A1 | 4/2005 | Aiba et al. | | |
| 2007/0120868 A1* | 5/2007 | Baek | ............................. | 345/600 |
| 2008/0055541 A1* | 3/2008 | Coulter et al. | ................ | 351/169 |
| 2008/0284881 A1* | 11/2008 | Ikizyan et al. | ................ | 348/258 |
| 2011/0096146 A1* | 4/2011 | Hulyalkar et al. | .............. | 348/43 |
| 2012/0257027 A1* | 10/2012 | Kawahara | ....................... | 348/56 |

FOREIGN PATENT DOCUMENTS

| | | |
|---|---|---|
| JP | 8065713 | 3/1996 |
| JP | 09-138384 A | 5/1997 |
| JP | 2000-036969 A | 2/2000 |
| JP | 2002-082307 A | 3/2002 |
| JP | 2003-045343 A | 2/2003 |
| JP | 2003274282 A | 9/2003 |
| JP | 2004253879 A | 9/2004 |
| JP | 2005124138 A | 5/2005 |
| JP | 2005148521 A | 6/2005 |
| JP | 2007158939 A | 6/2007 |

(Continued)

OTHER PUBLICATIONS

Office Action from Japanese Application No. 2009-283185, dated Jun. 18, 2013.

(Continued)

*Primary Examiner* — Frederick Bailey
(74) *Attorney, Agent, or Firm* — Lerner, David, Littenberg, Krumholz & Mentlik, LLP

(57) ABSTRACT

There is provided a display device including a video display portion that displays video, and a video signal control portion which performs signal control on an input signal such that a plurality of video streams formed of a plurality of chronologically arranged unit videos are input and there is a case in which display periods of the plurality of video streams are different with respect to an interval of the input signal that includes the plurality of video streams, and which sequentially switches in a time division manner the video streams included in the signal controlled input signal, and outputs the video streams to the video display portion.

6 Claims, 20 Drawing Sheets

(56) References Cited

FOREIGN PATENT DOCUMENTS

| | | | |
|---|---|---|---|
| JP | 2008-070838 | * | 3/2008 |
| JP | 2008252731 A | | 10/2008 |
| JP | 2009-025436 A | | 2/2009 |

OTHER PUBLICATIONS

Office Action from Chinese Application No. 2010-10576213.0, dated Jan. 6, 2014.

JP Office Action for Application No. 2009283185, dated Nov. 4, 2014.

* cited by examiner

FIG.1
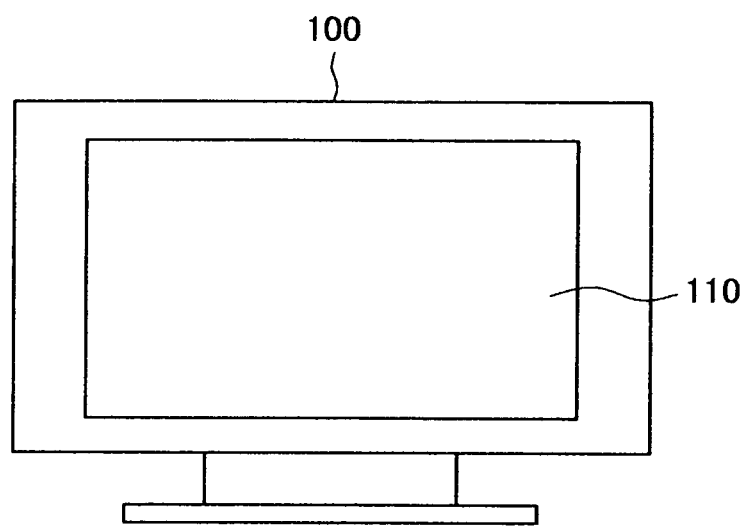
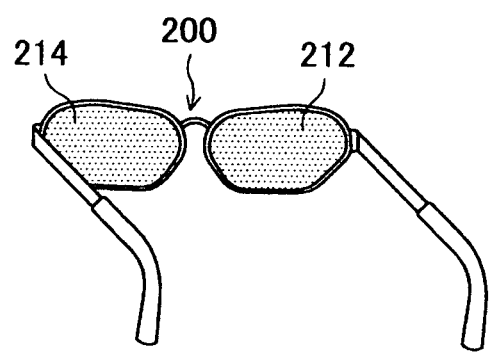

FIG.7

| | | | | | | | | |
|---|---|---|---|---|---|---|---|---|
| INPUT | L1R1 | | L2R2 | | L3R3 | | L4R4 | |
| OUTPUT (BEFORE DIVISION) | L1 | R1 | L1.8 | R1.8 | L2.6 | R2.6 | L3.4 | R3.4 | L4.2 | R4.2 |
| OUTPUT (AFTER DIVISION) | L1 | L1 | R1 | L1.8 | L1.8 | R1.8 | L2.6 | L2.6 | R2.6 | R2.6 | L3.4 | L3.4 | R3.4 | R3.4 | L4.2 | L4.2 | R4.2 | R4.2 |

FIG.8

| | | | | | | | |
|---|---|---|---|---|---|---|---|
| INPUT | L1R1 | L2R2 | L3R3 | L4R4 | | | |
| OUTPUT (BEFORE DIVISION) | L1 | R1.4 | L1.8 | R2.2 | L2.6 | R3 | L3.4 | R3.8 | L4.2 | R4.6 |
| OUTPUT (AFTER DIVISION) | L1 | L1 | R1.4 | R1.4 | L1.8 | L1.8 | R2.2 | R2.2 | L2.6 | L2.6 | R3 | R3 | L3.4 | L3.4 | R3.8 | R3.8 | L4.2 | L4.2 | R4.6 | R4.6 |

FIG.16

| | L1R1 | | | | L2R2 | | | |
|---|---|---|---|---|---|---|---|---|
INPUT

OUTPUT (BEFORE DIVISION): L1 | R1 | L1 | R1 | L1 | R1 | L2 | R2 | L2 | R2

OUTPUT (AFTER DIVISION): L1 | L1 | R1 | R1 | L1 | L1 | R1 | R1 | L2 | L2 | R2 | R2 | L2 | L2 | R2 | R2

FIG.17

| | | | | | | | |
|---|---|---|---|---|---|---|---|
| INPUT | L1R1 | | | | L2R2 | | |
| OUTPUT (BEFORE DIVISION) | L1 | R1.2 | L1.4 | R1.6 | L1.8 | R2 | L2.2 | R2.4 | L2.6 | R2.8 |
| OUTPUT (AFTER DIVISION) | L1 | R1.2 | L1.4 | R1.6 | L1.8 | R2 | L2.2 | R2.4 | L2.6 | R2.8 |

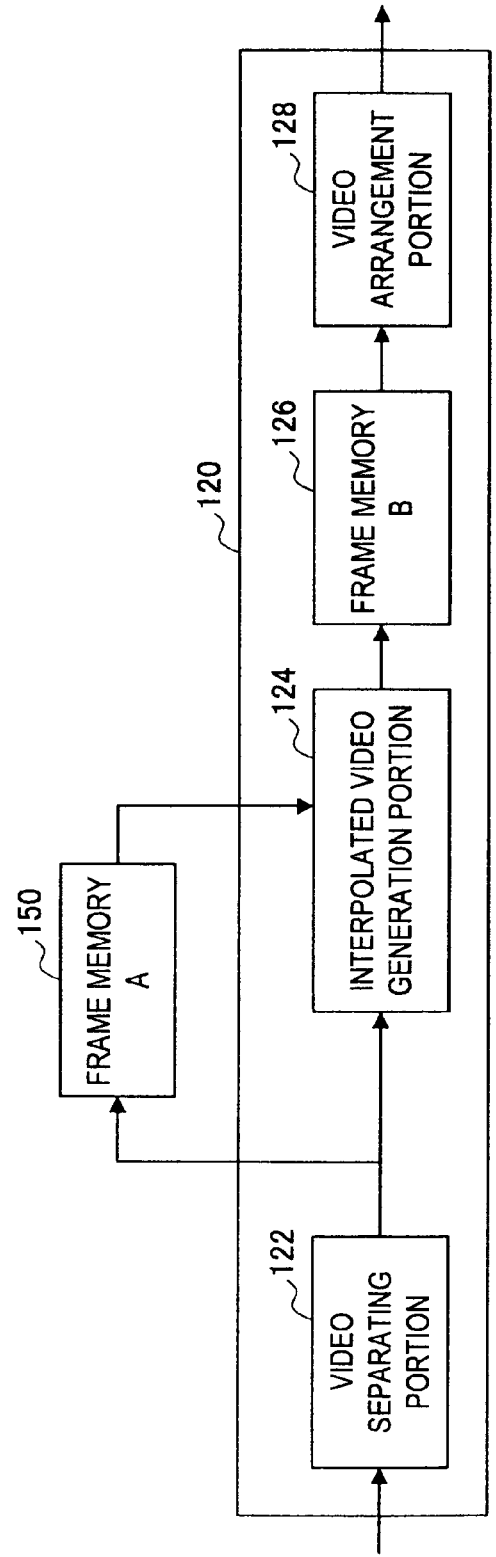

DISPLAY DEVICE, DISPLAY METHOD AND COMPUTER PROGRAM

CROSS-REFERENCE TO RELATED APPLICATION

The present application claims priority from Japanese Patent Application No. JP 2009-283185 filed in the Japanese Patent Office on Dec. 14, 2009, the entire content of which is incorporated herein by reference.

BACKGROUND OF THE INVENTION

1. Field of the Invention

The present invention relates to a display device, a display method and a computer program.

2. Description of the Related Art

A video display device that adopts a time-division driving method in a video display device that sequentially switches and outputs a plurality of video streams in a time division manner. The video display devices that adopt this type of time division driving method include time-division stereoscopic video display systems using shutter glasses (as described, for example, in Japanese Patent Application Publication No. JP-A-9-138384, Japanese Patent Application Publication No. JP-A-2000-36969 and Japanese Patent Application Publication No. JP-A-2003-45343) and multi-video display systems in which a plurality of viewers using shutter glasses view different video without division of a screen, and so on.

A time-division stereoscopic video display system is a video display system in which video for the left eye and video for the right eye are alternately displayed on an entire screen at very short intervals. At the same time, the system uses a stereoscopic video display device that separates the video and provides the video to the left eye and the video to the right eye in synchronization with the display interval of the video for the left eye and the video for the right eye. For example, when using the shutter glasses method, during a period in which the video for the left eye is displayed, a left eye portion of the shutter glasses allows light to pass through, while a right eye portion is blocked. Then, during a period in which the video for the right eye is displayed, the right eye portion of the shutter glasses allows light to pass through, and the left eye portion is blocked.

With respect to the HDMI1.4 standard, examples of stereoscopic video signal methods include frame packing, side by side and so on. These methods output and input signals including information of video for the left eye and video for the right eye mainly at 24 Hz, 50 Hz and 60 Hz. In the case of the time-division method, in known art, time-divided display is performed in which, with respect to the above-described 24 Hz, 50 Hz and 60 Hz signals, the video for the left eye and the video for the right eye are respectively displayed at 96 Hz, 100 Hz and 120 Hz, and opening/closing frequencies of the shutter glasses are 48 Hz, 50 Hz and 60 Hz, respectively.

SUMMARY OF THE INVENTION

Particularly for objects with a high luminance, when the opening/closing frequency of the shutter glasses is less than 60 Hz, flicker can be detected (as described, for example, in "The Sense", Horace Basil Barlow p. 154-157, J. D. Mollon, 1982). Thus, when the opening/closing frequency of the shutter glasses is 48 Hz or 50 Hz, flicker is recognized, particularly in sections of the screen that have high luminance and in ambient scenes in an environment of bright external light.

In a case in which flicker occurs when the opening/closing frequency of the shutter glasses is 48 Hz or 50 Hz, it is conceivable to adhere an optical film to the glasses and to the screen of the display device (as described, for example, in Japanese Patent Application Publication No. JP-A-2002-82307). However, adhering an optical film leads to increase in manufacturing costs of the shutter glasses and the display device, and further it is not possible to suppress the occurrence of flicker on the screen.

In light of the foregoing, it is desirable to provide a novel and improved display device, display method and computer program that inhibit increased costs in the manufacture of the shutter glasses and the display device, and that are also capable of suppressing flicker on a screen.

According to an embodiment of the present invention, there is provided a display device including a video display portion that displays video, and a video signal control portion which performs signal control on an input signal such that a plurality of video streams formed of a plurality of chronologically arranged unit videos are input and there is a case in which display periods of the plurality of video streams are different with respect to an interval of the input signal that includes the plurality of video streams, and which sequentially switches in a time division manner the video streams included in the signal controlled input signal, and outputs the video streams to the video display portion.

The video signal control portion may include an interpolated video generation portion that generates interpolated video from continuous unit videos belonging to a same one of the video streams.

The video signal control portion may perform signal control such that there is a case in which frames exist in which the unit video itself of the input signal is not output.

The video signal control portion may perform signal control such that the frames in which the unit video itself of the input signal is not output are different for each of the plurality of video streams.

The video signal control portion may perform signal control such that the video display portion displays the plurality of video streams in a time division manner at 125 Hz with respect to an input signal with a frequency of 50 Hz.

The video signal control portion may perform signal control such that the video display portion displays the plurality of video streams in a time division manner at 120 Hz with respect to an input signal with a frequency of 24 Hz.

The video signal control portion may perform signal control to further divide the plurality of video streams, which have been time divided, into a plurality of sub-frames.

The video signal control portion may perform signal control such that a predetermined gray level is displayed on an entire screen of the video display portion during at least one of the sub-frames.

The video display portion may be driven at a drive frequency equal to or less than 260 Hz.

According to another embodiment of the present invention, there is provided a display method, including the steps of performing signal control on an input signal such that there is a case in which display periods of a plurality of video streams formed of a plurality of chronologically arranged unit videos are different with respect to an interval of the input signal that includes the plurality of video streams, and performing video signal control such that the video streams included in the signal controlled input signal are sequentially switched and output in a time division manner, and performing time division display of the video streams on which signal control has been performed in the video signal control step.

According to another embodiment of the present invention, there is provided a computer program including instructions that command a computer to perform the steps of performing signal control on an input signal such that there is a case in which display periods of a plurality of video streams formed of a plurality of chronologically arranged unit videos are different with respect to an interval of the input signal that includes the plurality of video streams, and performing video signal control such that the video streams included in the signal controlled input signal are sequentially switched and output in a time division manner, and performing time division display of the video streams on which signal control has been performed in the video signal control step.

According to the present invention described above, it is possible to provide a novel and improved display device, display method and computer program that inhibit increased costs in the manufacture of the shutter glasses and the display device, and that are also capable of suppressing flicker on a screen.

BRIEF DESCRIPTION OF THE DRAWINGS

FIG. 1 is an explanatory diagram showing the outer appearance of a display device 100 according to an embodiment of the present invention;

FIG. 7 is an explanatory diagram illustrating a fourth operation example of the display device 100 according to the embodiment of the present invention;

FIG. 8 is an explanatory diagram illustrating a fifth operation example of the display device 100 according to the embodiment of the present invention;

FIG. 16 is an explanatory diagram illustrating an eleventh operation example of the display device 100 according to the embodiment of the present invention;

FIG. 17 is an explanatory diagram illustrating a twelfth operation example of the display device 100 according to the embodiment of the present invention;

FIG. 20 is an explanatory diagram showing an example of the structure of a video signal control portion 120.

DETAILED DESCRIPTION OF THE EMBODIMENT(S)

Figure 2:
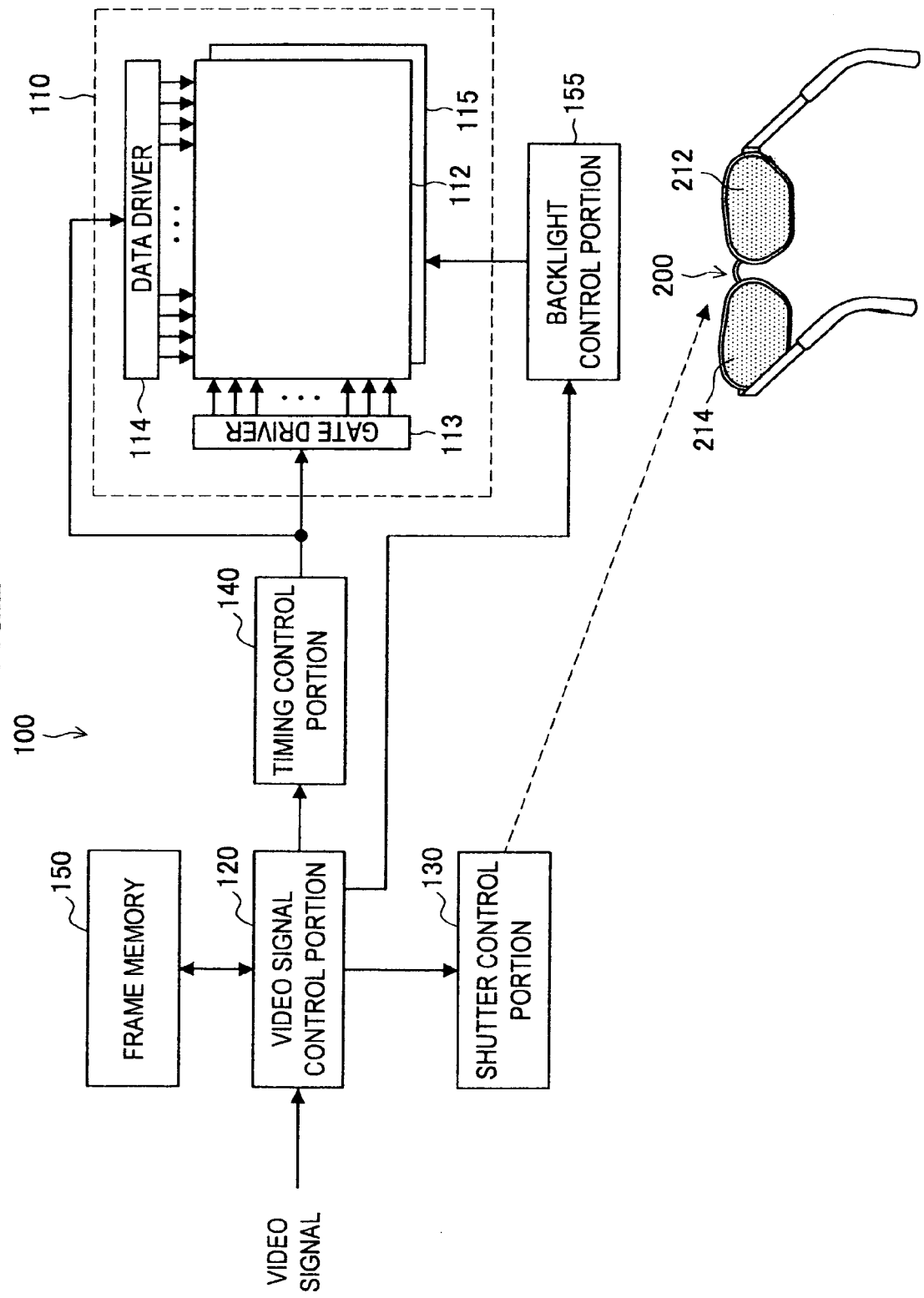
FIG. 2 is an explanatory diagram illustrating the functional structure of the display device 100 according to the embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

Note that the description will be given in the order shown below.

1. Embodiment of Present Invention
  1-1. Structure of display device according to embodiment of present invention
  1-2. Functional structure of display device according to embodiment of present invention
  1-3. Operations of display device according to embodiment of present invention
  1-3-1. When input signal frequency is 50 Hz
  1-3-2. When input signal frequency is 24 Hz
  1-4. Structure of video signal control portion when generating interpolated video
2. Conclusion 1. Embodiment of Present Invention
1-1. Structure of Display Device According to Embodiment of Present Invention Hereinafter, the structure of a display device according to an embodiment of the present invention will be explained. First, the outer appearance of the display device according to the embodiment of the present invention will be explained. FIG. 1 is an explanatory diagram showing the outer appearance of a display device 100 according to the embodiment of the present invention. Additionally, FIG. 1 also shows shutter glasses 200, which are used to cause a viewer to perceive an image displayed on the display device 100 as a stereoscopic image.

The display device 100 shown in FIG. 1 is provided with an image display portion 110 that displays images. The display device 100 does not only display normal images on the image display portion 110, but can also display three dimensional images on the image display portion 110 that are perceived by the viewer as stereoscopic images.

The structure of the image display portion 110 will be explained in more detail later. As a simple description here, the image display portion 110 includes a light source, a liquid crystal panel and a pair of polarizing plates that sandwich the liquid crystal panel. Light from the light source is polarized in a predetermined direction by passing through the liquid crystal panel and the polarizing plates. Note that a range of application of the present invention is not limited to the liquid crystal panel, and the present invention may be applied to another type of display device, such as a display device using a plasma display panel, an organic EL display device, or a projector etc.

The shutter glasses 200 include a right eye image transmission portion 212 and a left eye image transmission portion 214, which are liquid crystal shutters, for example. The shutter glasses 200 perform opening and closing operations of the right eye image transmission portion 212 and the left eye image transmission portion 214, in response to a signal transmitted from the display device 100. The viewer can perceive an image displayed on the image display portion 110 as a stereoscopic image, by looking at the light emitted from the image display portion 110 through the right eye image transmission portion 212 and the left eye image transmission portion 214 of the shutter glasses 200.

On the other hand, when a normal image is displayed on the image display portion 110, by seeing the light output from the image display portion 110 as it is, the viewer can perceive the image as the normal image.

Note that, in FIG. 1, the display device 100 is portrayed as a television receiver, but the present invention is naturally not limited to this example of the form of the display device 100. The display device 100 according to the present invention may be, for example, a monitor that is used when connected to an electronic appliance such as a personal computer or the like, or it may be a mobile game console, a mobile telephone, or a portable music playback device and so on.

The outer appearance of the display device 100 according to the embodiment of the present invention is described above. Next, the functional structure of the display device 100 according to the embodiment of the present invention will be explained.

1-2. Functional Structure of Display Device According to Embodiment of Present Invention FIG. 2 is an explanatory diagram showing the functional structure of the display device 100 according to the embodiment of the present invention. Hereinafter, the functional structure of the display device 100 according to the embodiment of the present invention will be explained with reference to FIG. 2.

As shown in FIG. 2, the display device 100 according to the embodiment of the present invention includes the image display portion 110, a video signal control portion 120, a shutter control portion 130, a timing control portion 140, a frame memory 150, and a backlight control portion 155.

The image display portion 110 displays images in the manner described above, and when a signal is applied from an external source, display of images is performed in accordance with the applied signal. The image display portion 110 includes a display panel 112, a gate driver 113, a data driver 114 and a backlight 115.

The display panel 112 displays images in accordance with the signal applied from an external source. The display panel 112 displays images by sequentially scanning a plurality of scanning lines. Liquid crystal molecules having a predetermined orientation are filled in a space between transparent plates, made of glass or the like, of the display panel 112. A drive system of the display panel 112 may be a twisted nematic (TN) system, a vertical alignment (VA) system, or an in-place-switching (IPS) system. In the following explanation, the drive system of the display panel 112 is the VA system, unless otherwise specified, but it goes without saying that the present invention is not limited to this example. Note that the display panel 112 according to the present embodiment is a display panel that can rewrite the screen at a high-speed frame rate (120 Hz and 240 Hz, for example). In the present embodiment, an image for the right eye and an image for the left eye are displayed alternately on the display panel 112 at a predetermined timing, thereby causing the viewer to perceive a stereoscopic image.

The gate driver 113 is a driver that drives a gate bus line (not shown in the figures) of the display panel 112. A signal is transmitted from the timing control portion 140 to the gate driver 113, and the gate driver 113 outputs a signal to the gate bus line in accordance with the signal transmitted from the timing control portion 140.

The data driver 114 is a driver that generates a signal that is applied to a data line (not shown in the figures) of the display panel 112. A signal is transmitted from the timing control portion 140 to the data driver 114. The data driver 114 generates a signal to be applied to the data line, in accordance with the signal transmitted from the timing control portion 140, and outputs the generated signal.

The backlight 115 is provided on the furthermost side of the image display portion 110 as seen from the side of the viewer. When an image is displayed on the image display portion 110, white light that is not polarized (unpolarized light) is output from the backlight 115 to the display panel 112 positioned on the side of the viewer. The backlight 115 may use a light-emitting diode, for example, or may use a cold cathode tube. Note that the backlight 115 shown in FIG. 2 is a surface light source, but the present invention is not limited to this form of light source. For example, the light source may be arranged around the peripheral edges of the display panel 112, and may output light to the display panel 112 by diffusing the light from the light source using a diffuser panel etc. Alternatively, for example, a point light source and a condenser lens may be used in combination in place of the surface light source.

When the video signal control portion 120 receives a video signal from an external source, the video signal control portion 120 performs various types of signal processing on the received video signal such that it is suitable for three-dimensional image display on the image display portion 110 and outputs the processed signal. The video signal on which signal processing has been performed by the video signal control portion 120 is transmitted to the timing control portion 140. Further, when the video signal control portion 120 performs signal processing, it transmits a predetermined signal to the shutter control portion 130 in accordance with the signal processing. The signal processing by the video signal control portion 120 is, for example, as described below.

When a video signal (a video signal for the right eye) to display an image for the right eye on the image display portion 110 and a video signal (a video signal for the left eye) to display an image for the left eye on the image display portion 110 are transmitted to the video signal control portion 120, the video signal control portion 120 generates, from the two video signals, a video signal for three dimensional images. In the present embodiment, from the input video signal for the right eye and video signal for the left eye, the video signal control portion 120 generates video signals to cause images to be displayed in a time division manner on the display panel 112 in the following order: image for the right eye→image for the left eye→image for the right eye→image for the left eye, and so on. In some cases, the image for the left eye and the image for the right eye are each displayed by repeatedly displaying a plurality of frames, and in such a case, the video signal control portion 120 generates video signals to cause images to be displayed, for example, in the following order: image for the right eye→image for the right eye→image for the left eye→image for the left eye→image for the right eye→image for the right eye and so on.

The shutter control portion 130 receives transmission of a predetermined signal that is generated based on signal processing by the video signal control portion 120. Based on the received predetermined signal, the shutter control portion 130 generates a shutter control signal that controls a shutter operation of the shutter glasses 200. Based on the shutter control signal that is generated by the shutter control portion 130 and emitted from an infra-red emitter (not shown in the figures), the shutter glasses 200 perform opening and closing operations of the right eye image transmission portion 212 and the left eye image transmission portion 214. Note that, in the present invention, a method of communication between the shutter glasses 200 and the display device 100 is not limited to infrared rays. For example, communication may be performed between the shutter glasses 200 and the display device 100 using high frequency electromagnetic waves. The backlight control portion 155 receives transmission of a predetermined signal that is generated based on the signal processing by the video signal control portion 120. Based on the received predetermined signal, the backlight control portion 155 generates a backlight control signal that controls an illumination operation of the backlight.

Based on a signal transmitted from the video signal control portion 120, the timing control portion 140 generates pulse signals that are used in operation of the gate driver 113 and the data driver 114. By generating the pulse signals in the timing control portion 140, and by the gate driver 113 and the data driver 114 receiving the pulse signals generated by the timing control portion 140, images are displayed on the display panel 112 in accordance with signals transmitted from the video signal control portion 120.

The frame memory 150 temporarily stores the video signals that are generated based on the signal processing by the video signal control portion 120.

The functional structure of the display device 100 according to the embodiment of the present invention is explained above with reference to FIG. 2. Next, operations of the display device 100 according to the embodiment of the present invention will be explained. In the following explanation, cases are described in which input signals input to the display device 100 are a left eye video stream and a right eye video stream where parallax exists between the two streams.

1-3. Operations of Display Device According to Embodiment of Present Invention 1-3-1. When Input Signal Frequency is 50 Hz First, an example will be shown in which an input signal frequency is 50 Hz. Here, the input signal is, for example, a signal that includes a left eye video stream and a right eye video stream in a frame packing format, a side by side format or the like. Note that in this case, an interlace signal is converted to a progressive signal by I/P conversion.

Figure 3:
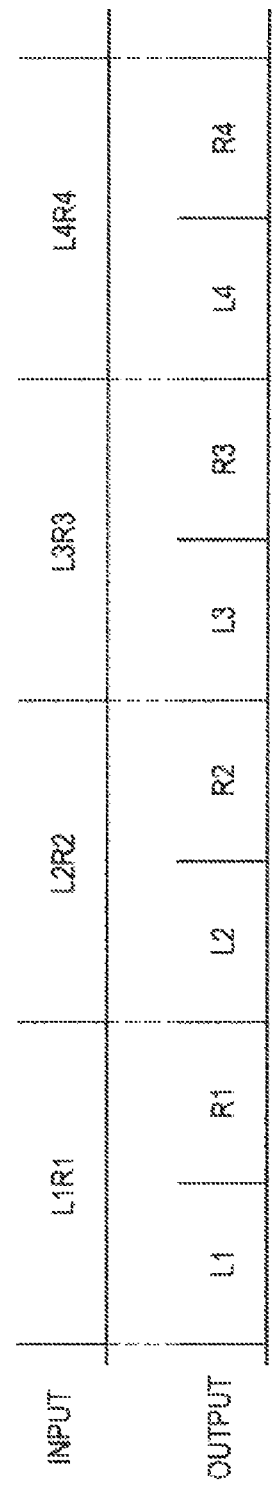
FIG. 3 is an explanatory diagram illustrating time-divided display of a left eye video stream and a right eye video stream according to known art.

FIG. 3 is an explanatory diagram illustrating time division display of the left eye video stream and the right eye video stream according to known art. Note that, in FIG. 3, a dotted line joining an input and an output indicates a time width, and time points joined by the dotted line are not necessarily the same point in time. In actuality, for example, from when L1 and R1 are input into the display device 100, L1 and R1 are output after a certain period of time has elapsed. As shown in FIG. 3, in known methods, time division display is performed of the left eye video stream and the right eye video stream at 100 Hz. Here, for example, L1 indicates a first unit of video (first unit video) of the left eye video stream, and L2 indicates a second unit of video (second unit video) of the left eye video stream. Further, R1 indicates a first unit of video (first unit video) of the right eye video stream, and R2 indicates a second unit of video (second unit video) of the right eye video stream. At this time, the opening/closing frequency of the shutter glasses 200 is 50 Hz, and, as described above, flicker is detected when the opening/closing frequency of the shutter glasses 200 is less than 60 Hz.

In the present embodiment, in order to suppress flicker, a display period of the left eye video stream and a display period of the right eye video stream are caused to be different with respect to an input signal interval. Hereinafter, the operations of the display device 100 according to the embodiment of the present invention will be explained using specific examples.

Figure 4:
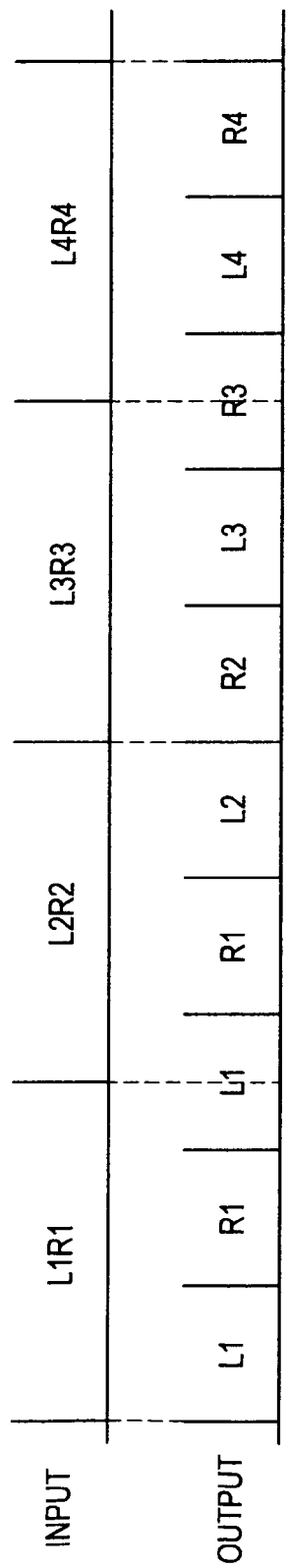
FIG. 4 is an explanatory diagram illustrating a first operation example of the display device 100 according to the embodiment of the present invention.

FIG. 4 is an explanatory diagram showing a first operation example of the display device 100 according to the embodiment of the present invention. Hereinafter, the first operation example of the display device 100 according to the embodiment of the present invention will be explained with reference to FIG. 4. It should be noted that, in FIG. 4, a dotted line joining an input and an output indicates a time width, and time points joined by the dotted line are not necessarily the same point in time. In actuality, for example, from when L1 and R1 are input into the display device 100, there are cases in which L1 and R2 are output after a certain period of time has elapsed.

In the example shown in FIG. 4, when the left eye video stream and the right eye video stream are input into the display device 100, the video signal control portion 120 performs processing such that the display period of the left eye video stream and the display period of the right eye video stream are caused to be different with respect to the input signal interval. More specifically, the video signal control portion 120 uses the left eye video stream and the right eye video stream, which are input at 50 Hz, and generates a signal such that the left eye video stream and the right eye video stream are displayed in a time division manner at 125 Hz. As a result, the video for the left eye and the video for the right eye can be generated such that the display period of the left eye video stream and the display period of the right eye video stream are different with respect to the input signal interval. In the example shown in FIG. 4, when the input signal interval is 20 msec, the display period of the left eye video stream is, for example, 12 msec, and the display period of the right eye video stream is 8 msec, and thus the respective display periods of the left eye video stream and the right eye video stream are different.

In this way, by the video signal control portion 120 generating a signal such that the left eye video stream and the right eye video stream are displayed in a time division manner at 125 Hz, the opening/closing frequency of the shutter glasses 200 can be 62.5 Hz. As a consequence, the opening/closing frequency of the shutter glasses 200 is greater than 60 Hz, and thus it is possible to inhibit the occurrence of flicker when viewing through the shutter glasses 200.

In the example shown in FIG. 4, the video signal control portion 120 generates the signal such that display is performed in a time division manner simply with the input signal at 125 Hz, but the video signal control portion 120 may generate interpolated video from the input signals. Hereinafter, cases will be explained in which the video signal control portion 120 uses the input signals to generate interpolated video.

Figure 5:
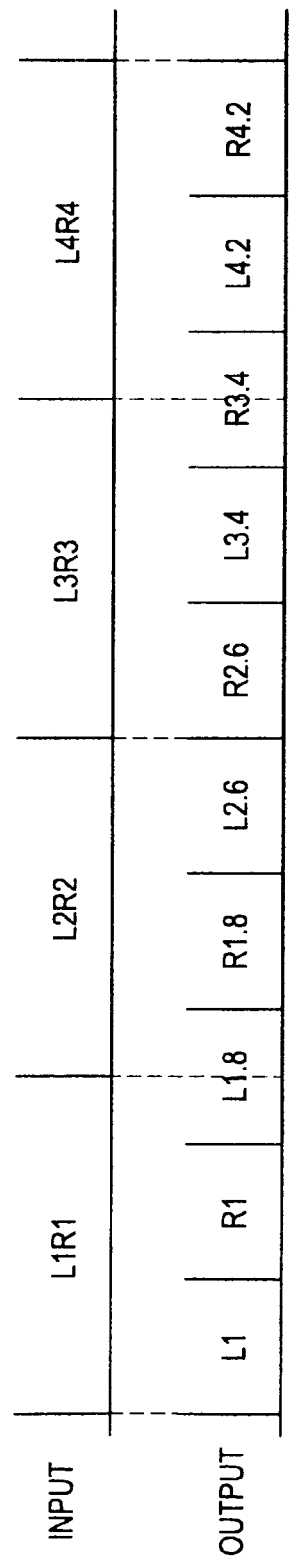
FIG. 5 is an explanatory diagram illustrating a second operation example of the display device 100 according to the embodiment of the present invention.

FIG. 5 is an explanatory diagram showing a second operation example of the display device 100 according to the embodiment of the present invention. Hereinafter, the second operation of the display device 100 according to the embodiment of the present invention will be explained with reference to FIG. 5. It should be noted that, in FIG. 5, a dotted line joining an input and an output indicates a time width, and time points joined by the dotted line are not necessarily the same point in time. In actuality, for example, from when L1 and R1 are input into the display device 100, there are cases in which L1 and R1 are output after a certain period of time has elapsed. This also applies to the following drawings.

In the example shown in FIG. 5, when the left eye video stream and the right eye video stream are input into the display device 100, the video signal control portion 120 generates interpolated video from the left eye video stream and the right eye video stream and outputs the interpolated video. Note that the input signals may be temporarily stored in the frame memory 150 when the video signal control portion 120 generates the interpolated video.

For example, "L1.8" in FIG. 5 is interpolated unit video that is generated from the first unit video L1 of the left eye video stream and the second unit video L2 of the left eye video stream. Taking a time difference between the first unit video L1 of the left eye video stream and the second unit video L2 of the left eye video stream as a unit of 1, the figure "1.8" indicates the interpolated unit video at a time point when 0.8 (of the unit of 1) has elapsed from L1. This also applies in the following explanation. When the input is 50 Hz, the input interval of each video stream is 20 msec, and thus "L1.8", for example, refers to the interpolated unit video after 16 msec has elapsed from the first unit video L1 of the left eye video stream, the interpolated unit video being generated from the first unit video L1 of the left eye video stream and the second unit video L2 of the left eye video stream.

At this time, each of the input signals L2, R2, L3, R3, L4 and R4 shown in FIG. 5 are not output as they are, but interpolated video generated from the unit video is output to the image display portion 110. By outputting the interpolated video generated from the unit video to the image display portion 110 in this way, even when the display period of the left eye video stream and the display period of the right eye video stream are different to each other with respect to the input signal interval, it is possible to perform output at a constant time interval.

Figure 6:
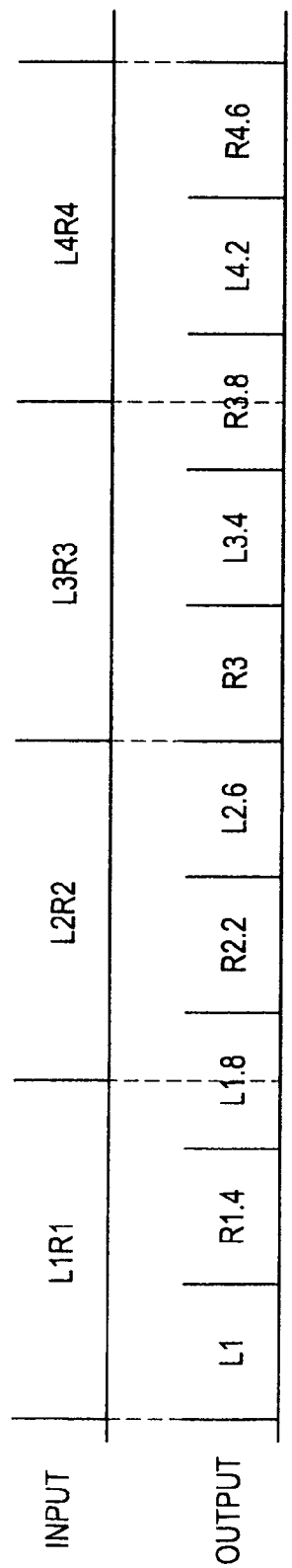
FIG. 6 is an explanatory diagram illustrating a third operation example of the display device 100 according to the embodiment of the present invention.

Note that frames in which the unit video itself of the input signal is not output may be different for each of the plurality of video streams. FIG. 6 is an explanatory diagram showing a third operation example of the display device 100 according to the embodiment of the present invention. In the third operation example shown in FIG. 6, in contrast to the second operation example shown in FIG. 5, interpolated video "R1.4" is generated by the video signal control portion 120 from the first unit video R1 of the right eye video stream and the second unit video R2 of the right eye video stream. Further, in the second operation example shown in FIG. 5, interpolated video "R2.6" is generated by the video signal control portion 120 from the second unit video R2 of the right eye video stream and a third unit video R3 of the right eye video stream. However, in the third operation example shown in FIG. 6, in the corresponding time band, the third unit video R3 of the right eye video stream is output without change by the video signal control portion 120. In the third operation example shown in FIG. 6, as output of interpolated video is not required when outputting the third unit video R3, there is no need to store the second unit video R2 in the frame memory 150 and the frame memory 150 can be efficiently used.

It should be noted that, in liquid crystal display devices etc., when performing line-sequential writing and when it is a hold-type display device, mixing of consecutive different video streams occurs in an upper section of a screen. This mixing is referred to as crosstalk, and leads to deterioration in video quality. Here, it is known that the occurrence of crosstalk can be reduced by further dividing display periods of a plurality of video streams displayed in a time division manner into sub-frames. For example, in a display device using a liquid crystal panel, crosstalk can be reduced by dividing the display period of the plurality of video streams into two sub-frames and performing overdrive processing to cause a desired luminance to be reached in a first sub-frame and the desired luminance to be maintained in a second sub-frame. In a next example of the operation of the display device 100 according to the embodiment of the present invention, a case will be explained in which, when interpolated video is used, frames are further divided into sub-frames and the interpolated video is output.

FIG. 7 is an explanatory diagram showing a fourth operation example of the display device 100 according to the embodiment of the present invention. Hereinafter, the fourth operation example of the display device 100 according to the embodiment of the present invention will be explained with reference to FIG. 7.

The fourth operation example shown in FIG. 7 shows a case in which, for each of the outputs of the second operation example shown in FIG. 5, one frame is divided into two sub-frames by the video signal control portion 120. In this example, the unit video is repeatedly output for all of the divided sub-frames. In this case, the video signal control portion 120 generates signals such that the left eye video stream and the right eye video stream are displayed in a time division manner at 125 Hz per frame. By dividing each of the frames into the two sub-frames and performing output in this way, it is possible to suppress the occurrence of crosstalk.

FIG. 8 is an explanatory diagram showing a fifth operation example of the display device 100 according to the embodiment of the present invention. Hereinafter, the fifth operation example of the display device 100 according to the embodiment of the present invention will be explained with reference to FIG. 8.

The fifth operation example shown in FIG. 8 shows a case in which, for each of the outputs of the third operation example shown in FIG. 6, one frame is divided into two sub-frames by the video signal control portion 120. In this example, the unit video is repeatedly output for all of the divided sub-frames. In this case also, similarly to the fourth operation example, the video signal control portion 120 generates signals such that the left eye video stream and the right eye video stream are displayed in a time division manner at 125 Hz per frame. By dividing each of the frames into the two sub-frames and performing output in this way, it is possible to suppress the occurrence of crosstalk.

Figure 9:
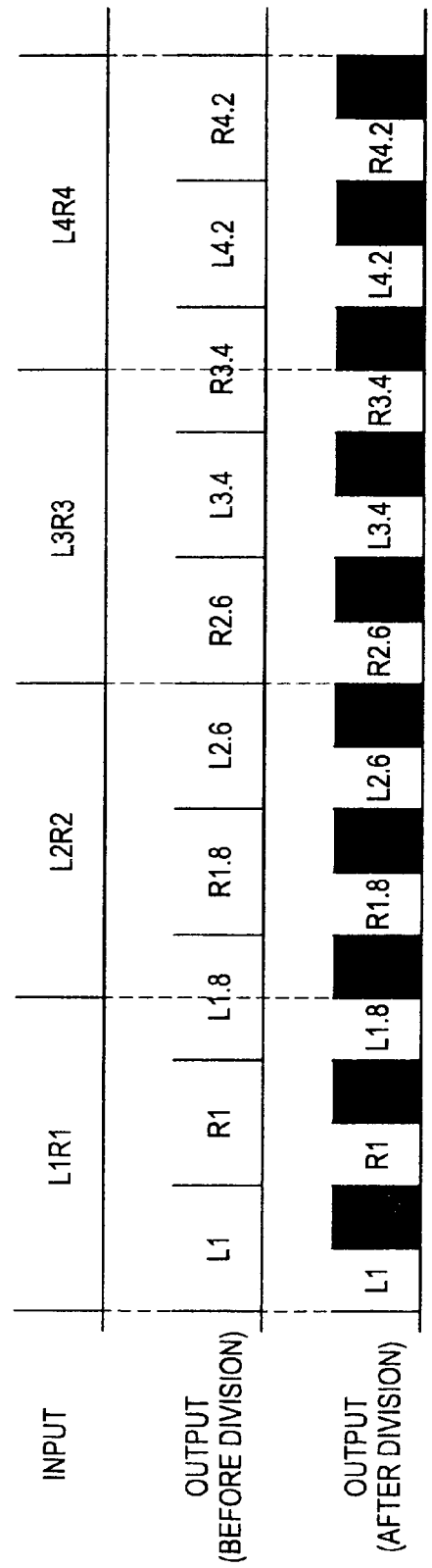
FIG. 9 is an explanatory diagram illustrating a sixth operation example of the display device 100 according to the embodiment of the present invention.

FIG. 9 is an explanatory diagram showing a sixth operation example of the display device 100 according to the embodiment of the present invention. The sixth operation example of the display device 100 according to the embodiment of the present invention will be explained hereinafter with reference to FIG. 9.

The sixth operation example shown in FIG. 9 shows a case in which, for each of the outputs of the second operation example shown in FIG. 5, one frame is divided into two sub-frames by the video signal control portion 120. This example shows a case in which, during at least one of the divided sub-frames, an image of a chosen gray scale (for example, an image with a low gray scale, such as black or gray) is displayed on the entire image display portion 110. In this case, the video signal control portion 120 generates signals such that the left eye video stream and the right eye video stream are displayed in a time division manner at 125 Hz per frame. By dividing each of the frames into the two sub-frames and performing output in this way, it is possible to suppress the occurrence of crosstalk.

Figure 10:
FIG. 10 is an explanatory diagram illustrating a seventh operation example of the display device 100 according to the embodiment of the present invention.

FIG. 10 is an explanatory diagram showing a seventh operation example of the display device 100 according to the embodiment of the present invention. The seventh operation example of the display device 100 according to the embodiment of the present invention will hereinafter be explained with reference to FIG. 10.

The seventh operation example shown in FIG. 10 shows a case in which, for each of the outputs of the third operation example shown in FIG. 6, one frame is divided into two sub-frames by the video signal control portion 120. This example shows a case in which, during at least one of the divided sub-frames, an image with a low gray scale (such as black or gray) is displayed. In this case, the video signal control portion 120 generates signals such that the left eye video stream and the right eye video stream are displayed in a time division manner at 250 Hz per frame. By dividing each of the frames into the two sub-frames and performing output in this way, it is possible to suppress the occurrence of crosstalk.

If time division is performed at 100 Hz on an input signal of 50 Hz, flicker occurs, and thus, as an extension of known art, when time division is performed at 150 Hz (three times the input signal frequency) the opening/closing frequency of the shutter glasses 200 becomes 75 Hz, and flicker can be suppressed. However, in addition to performing time division at a drive frequency of 150 Hz, when division into sub-frames is performed as described above, a drive frequency of at least 300 Hz is required. Particularly when using a liquid crystal display device, the drive frequency is limited by mobility of a thin film transistor (TFT) and so on (refer to Mamoru Furuta, "Future Developments of TFT Technology in terms of Video Display," Mitsui Zosen Technical Review No. 194). In display devices that have resolution exceeding full HD (1920× 1080), and that exceed 30 inches in size, a limit on the drive frequency is approximately 260 Hz (with current technology) (refer to S. S. Kim et al., "World's first 240 Hz TFT-LCD Technology for Full-HD LCD-TV and Its Application to 3D Display", SID Symposium Digest, p. 424-427 (2009)). It is thus desirable for the final drive frequency to be equal to or less than 260 Hz.

As described above, by causing the display periods of the left eye video stream and the right eye video stream to be different with respect to the input signal interval when the frequency of the input signal is 50 Hz, it is possible to reduce the drive frequency and, at the same time, to raise the opening/closing frequency of the shutter glasses 200, thus suppressing the occurrence of flicker.

1-3-2. When Input Signal Frequency is 24 Hz

Next, an example will be shown in which the input signal frequency is 24 Hz. Here, the input signal is, for example, a signal that includes the left eye video stream and the right eye video stream in the frame packing format, the side by side format or the like. Note that in this case, an interlace signal is converted to a progressive signal by I/P conversion.

Figure 11:
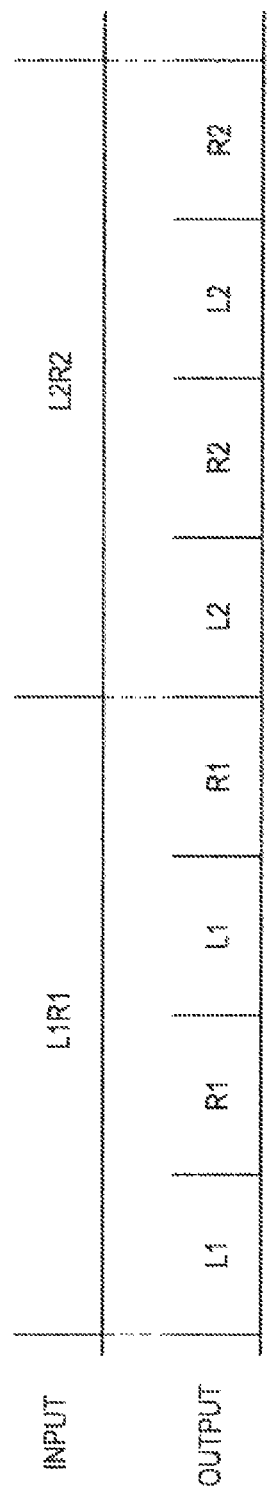
FIG. 11 is an explanatory diagram illustrating time division display of a left eye video stream and a right eye video stream according to known art.
Figure 12:
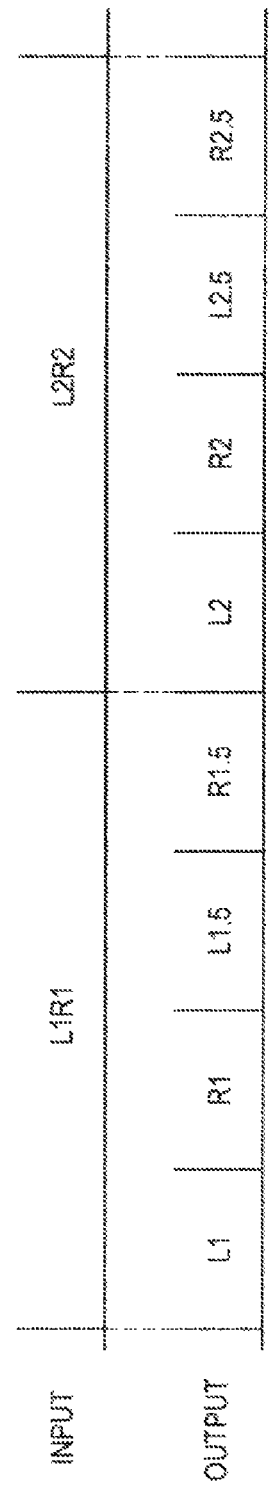
FIG. 12 is an explanatory diagram illustrating time-divided display of a left eye video stream and a right eye video stream according to known art.

FIG. 11 and FIG. 12 are explanatory diagrams showing time division display of the left eye video stream and the right eye video stream in known art. As shown in FIG. 11, when the input signal is 24 Hz, in known methods, time division display of the left eye video stream and the right eye video stream is performed at 96 Hz. Here, for example, L1 indicates the first unit video of the left eye video stream and L2 indicates the second unit video of the left eye video stream. Further, R1 indicates the first unit video of the right eye video stream, and R2 indicates the second unit video of the right eye video stream. At this time, the opening/closing frequency of the shutter glasses 200 is 48 Hz, and as described above, flicker is detected when the opening/closing frequency of the shutter glasses 200 is less than 60 Hz.

Further, as shown in FIG. 12, even when interpolated video is generated using the left eye video stream and the right eye video stream, as time division display is performed at 96 Hz, the opening/closing frequency of the shutter glasses 200 similarly becomes 48 Hz, and the opening/closing frequency of the shutter glasses 200 is therefore lower than 60 Hz. Thus, the flicker is detected.

In the present embodiment, in order to suppress flicker, the display period of the left eye video stream and the display period of the right eye video stream are caused to be different with respect to the input signal interval. Hereinafter, operations of the display device 100 according to the embodiment of the present invention will be explained using specific examples.

Figure 13:
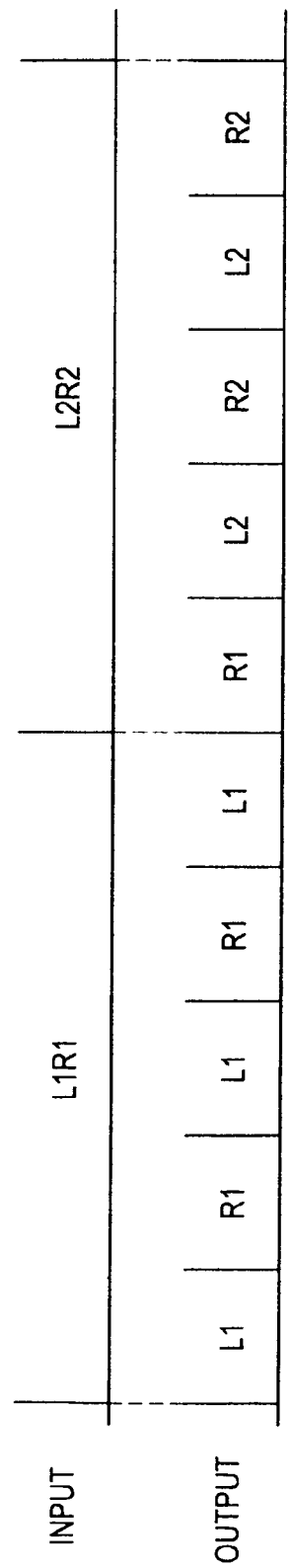
FIG. 13 is an explanatory diagram illustrating an eighth operation example of the display device 100 according to the embodiment of the present invention.

FIG. 13 is an explanatory diagram showing an eighth operation example of the display device 100 according to the embodiment of the present invention. Hereinafter, the eighth operation example of the display device 100 according to the embodiment of the present invention will be explained with reference to FIG. 13.

In the example shown in FIG. 13, when the left eye video stream and the right eye video stream are input into the display device 100, the video signal control portion 120 performs processing such that the display period of the left eye video stream and the display period of the right eye video stream are caused to be different with respect to the input signal interval. More specifically, the video signal control portion 120 uses the left eye video stream and the right eye video stream, which are input at 24 Hz, and generates a signal such that the left eye video stream and the right eye video stream are displayed in a time division manner at 120 Hz. As a result, the video for the left eye and the video for the right eye can be generated such that the display period of the left eye video stream and the display period of the right eye video stream are different with respect to the input signal interval. In the example shown in FIG. 13, when the input signal interval is 1/24 sec (approximately 41.7 msec), while the display period of the left eye video stream is, for example, 1/40 sec (approximately 25 msec), the display period of the right eye video stream is 1/60 sec (approximately 16.7 msec), and thus the respective display periods of the left eye video stream and the right eye video stream are different.

In this way, by the video signal control portion 120 generating a signal such that the left eye video stream and the right eye video stream are displayed in a time division manner at 120 Hz, the opening/closing frequency of the shutter glasses 200 can be 60 Hz. As a consequence, the opening/closing frequency of the shutter glasses 200 is equal to or greater than 60 Hz, and thus it is possible to inhibit the occurrence of flicker when viewing through the shutter glasses 200.

In the example shown in FIG. 13, the video signal control portion 120 generates the signal such that display is performed in a time division manner simply with the input signal at 120 Hz, but the video signal control portion 120 may generate interpolated video from the input signals. Hereinafter, cases will be explained in which the video signal control portion 120 uses the input signals to generate interpolated video.

Figure 14:
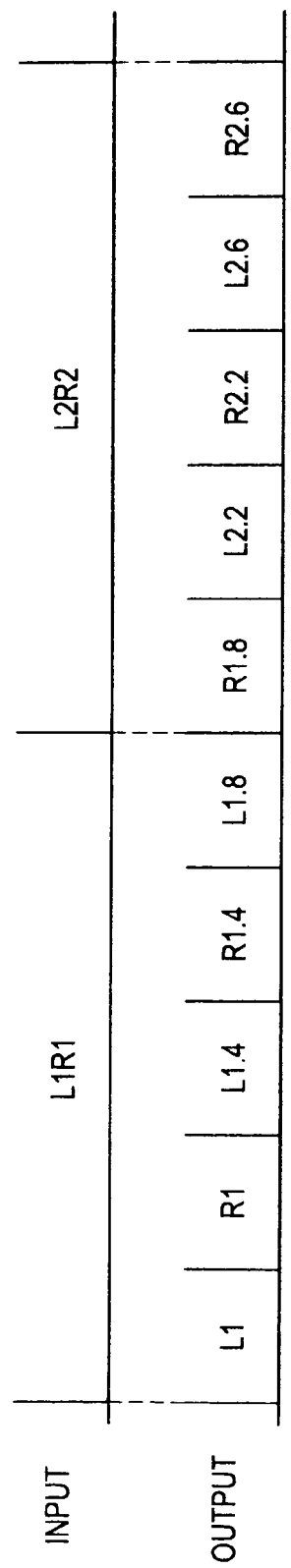
FIG. 14 is an explanatory diagram illustrating a ninth operation example of the display device 100 according to the embodiment of the present invention.

FIG. 14 is an explanatory diagram showing a ninth operation example of the display device 100 according to the embodiment of the present invention. The ninth operation example of the display device 100 according to the embodiment of the present invention will hereinafter be explained with reference to FIG. 14.

In the ninth operation example of the display device 100 shown in FIG. 14, when the left eye video stream and the right eye video stream are input into the display device 100, the video signal control portion 120 generates interpolated video from the left eye video stream and the right eye video stream and outputs the interpolated video. Note that the input signals may be temporarily stored in the frame memory 150 when the video signal control portion 120 generates the interpolated video.

For example, "L1.4" in FIG. 14 is interpolated unit video that is generated from the first unit video L1 of the left eye video stream and the second unit video L2 of the left eye video stream. Taking a time difference between the first unit video L1 of the left eye video stream and the second unit video L2 of the left eye video stream as a unit of 1, the figure "1.4" indicates the interpolated unit video at a time point when 0.4 (of the unit of 1) has elapsed from L1. This also applies to FIG. 14 below. When the input is 24 Hz, the input interval of each video stream is ¹⁄₂₄ sec (approximately 41.7 msec), and thus "L1.4", for example, refers to the interpolated unit video after ¹⁄₆₀ sec (approximately 16.7 msec) has elapsed from the first unit video L1 of the left eye video stream, the interpolated unit video being generated from the first unit video L1 of the left eye video stream and the second unit video L2 of the left eye video stream.

In this case, the video signal control portion 120 does not output each of the input signals L2 and R2 shown in FIG. 14 as they are, but outputs the interpolated video generated from the unit video to the image display portion 110. By the video signal control portion 120 outputting the interpolated video generated from the unit video to the image display portion 110 in this way, even when the display period of the left eye video stream and the display period of the right eye video stream are different to each other with respect to the input signal interval, it is possible to perform output at a constant time interval.

Figure 15:
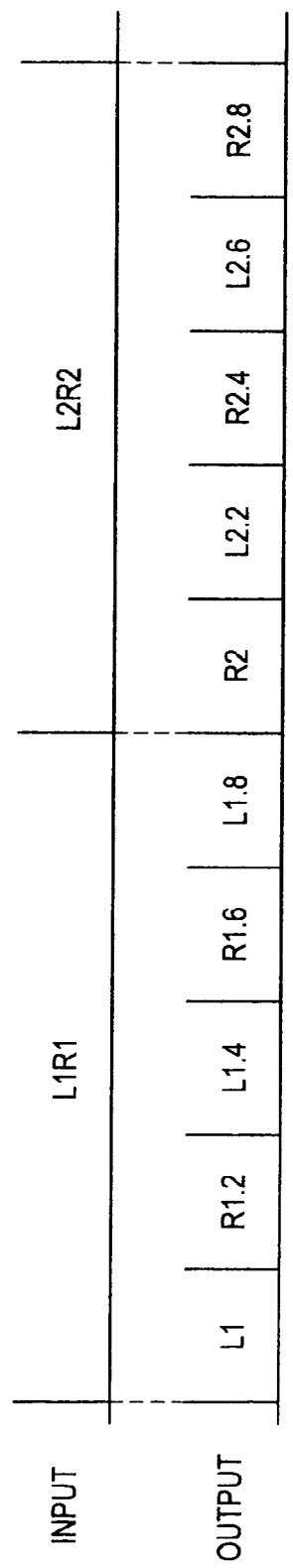
FIG. 15 is an explanatory diagram illustrating a tenth operation example of the display device 100 according to the embodiment of the present invention.

Note that frames in which the unit video itself of the input signal is not output may be different for each of the plurality of video streams. FIG. 15 is an explanatory diagram showing a tenth operation example of the display device 100 according to the embodiment of the present invention. In the tenth operation example shown in FIG. 15, in contrast to the ninth operation example shown in FIG. 14, interpolated video "R1.2" is generated from the first unit video R1 of the right eye video stream and the second unit video R2 of the right eye video stream.

Further, in the ninth operation example shown in FIG. 14, interpolated video "R1.8" is generated from the first unit video R1 of the right eye video stream and the second unit video R2 of the right eye video stream, but in the tenth operation example shown in FIG. 15, in the corresponding time band, the second unit video R2 of the right eye video stream is output without change. In the tenth operation example shown in FIG. 15, as output of interpolated video is not required when outputting the second unit video R2, there is no need to store the first unit video R1 in the frame memory 150 and the frame memory 150 can be efficiently used.

It should be noted that, even when the input is 24 Hz, similarly to the above-described case in which the input is 50 Hz, it is possible to reduce the problem of the occurrence of crosstalk by further dividing into sub-frames the display period of the plurality of video streams that are displayed in a time division manner. Here, cases will be explained in which, in the operation examples of the display device 100 according to the embodiment of the present invention, when using the interpolated video, frames are further divided into sub-frames and the interpolated video is output.

FIG. 16 is an explanatory diagram showing an eleventh operation example of the display device 100 according to the embodiment of the present invention. The eleventh operation example of the display device 100 according to the embodiment of the present invention will hereinafter be explained with reference to FIG. 16.

The eleventh operation example shown in FIG. 16 shows a case in which, for each of the outputs of the ninth operation example shown in FIG. 14, one frame is divided into two sub-frames, and the unit video is repeatedly output for all of the divided sub-frames. In this case, the video signal control portion 120 generates signals such that the left eye video stream and the right eye video stream are displayed in a time division manner at 120 Hz per frame. By dividing each of the frames into the two sub-frames and performing output in this way, it is possible to suppress the occurrence of crosstalk.

FIG. 17 is an explanatory diagram showing a twelfth operation example of the display device 100 according to the embodiment of the present invention. The twelfth operation example of the display device 100 according to the embodiment of the present invention will hereinafter be explained with reference to FIG. 17.

The twelfth operation example shown in FIG. 11 shows a case in which, for each of the outputs of the tenth operation example shown in FIG. 15, one frame is divided into two sub-frames, and the unit video is repeatedly output for all of the divided sub-frames. In this case also, similarly to the eleventh operation example, the video signal control portion 120 generates signals such that the left eye video stream and the right eye video stream are displayed in a time division manner at 120 Hz per frame. By dividing each of the frames into the two sub-frames and performing output in this way, it is possible to suppress the occurrence of crosstalk.

Figure 18:
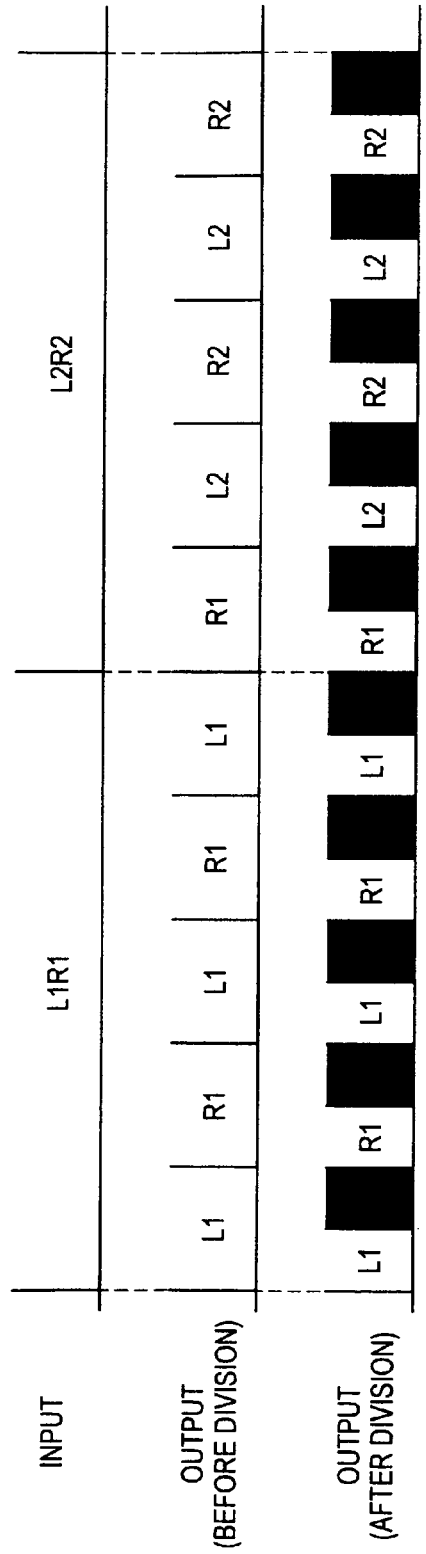
FIG. 18 is an explanatory diagram illustrating a thirteenth operation example of the display device 100 according to the embodiment of the present invention.

FIG. 18 is an explanatory diagram showing a thirteenth operation example of the display device 100 according to the embodiment of the present invention. The thirteenth operation example of the display device 100 according to the embodiment of the present invention will hereinafter be explained with reference to FIG. 18.

The thirteenth operation example shown in FIG. 18 shows a case in which, for each of the outputs of the ninth operation example shown in FIG. 14, one frame is divided into two sub-frames. This example shows a case in which, during at least one of the divided sub-frames, an image of a chosen gray scale (for example, an image with a low gray scale, such as black or gray) is displayed on the entire image display portion 110. In this case, the video signal control portion 120 generates signals such that the left eye video stream and the right eye video stream are displayed in a time division manner at 120 Hz per frame. By dividing each of the frames into the two sub-frames and performing output in this way, it is possible to suppress the occurrence of crosstalk.

Figure 19:
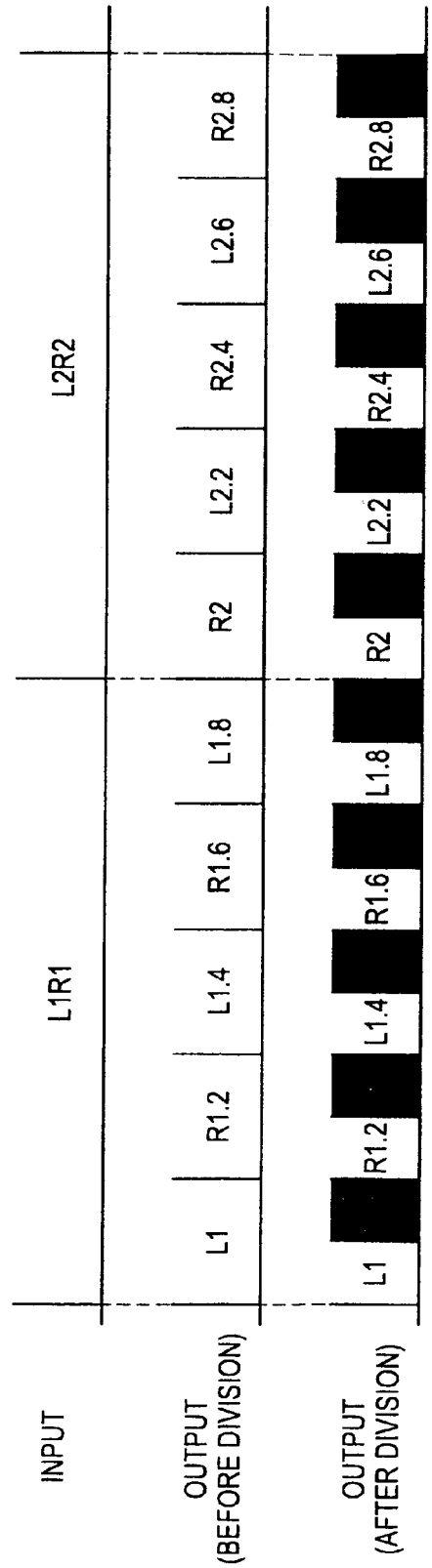
FIG. 19 is an explanatory diagram illustrating a fourteenth operation example of the display device 100 according to the embodiment of the present invention.

FIG. 19 is an explanatory diagram showing a fourteenth operation example of the display device 100 according to the embodiment of the present invention. The fourteenth operation example of the display device 100 according to the embodiment of the present invention will hereinafter be explained with reference to FIG. 19.

The fourteenth operation example shown in FIG. 19 shows a case in which, for each of the outputs of the tenth operation example shown in FIG. 15, one frame is divided into two sub-frames. This example shows a case in which, during at least one of the divided sub-frames, an image of a chosen gray scale (for example, an image with a low gray scale, such as black or gray) is displayed on the entire image display portion 110. In this case, the video signal control portion 120 generates signals such that the left eye video stream and the right eye video stream are displayed in a time division manner at 120 Hz per frame. By dividing each of the frames into the two sub-frames and performing output in this way, it is possible to suppress the occurrence of crosstalk.

As described above, by causing the display periods of the left eye video stream and the right eye video stream to be different with respect to the input signal interval (the input signal being input at 24 Hz), it is possible to lower the drive frequency and, at the same time, to raise the opening/closing frequency of the shutter glasses 200, thus suppressing flicker.

1-4. Structure of Video Signal Control Portion when Generating Interpolated Video Next, with respect to each of the above-described examples of the embodiment, the structure of the video signal control portion 120 when generating the interpolated video will be described. FIG. 20 is an explanatory diagram showing an example of the structure of the video signal control portion 120 when generating the interpolated video in each of the above-described examples of the embodiment. Hereinafter, the example of the structure of the video signal control portion 120 will be explained with reference to FIG. 20.

As shown in FIG. 20, the video signal control portion 120 includes a video separating portion 122, an interpolated video generation portion 124, a frame memory 126 (a frame memory B) and a video arrangement portion 128.

The video separating portion 122 separates an input signal, which includes a plurality of video streams (for example, video for the left eye and video for the right eye), into respective video signals and sequentially outputs the video signals in a time division manner. The video signals separated by the video separating portion 122 are transmitted to the interpolated video generation portion 124 and to the frame memory 150 (frame memory A).

The interpolated video generation portion 124 generates interpolated video from past unit video stored in the frame memory 150 and from unit video output from the video separating portion 122. The interpolated video generated by the interpolated video generation portion 124 is transmitted to the frame memory 126.

The video arrangement portion 128 re-arranges video signals, which are generated in the interpolated video generation portion 124 and that are temporarily stored in the frame memory 126, such that the plurality of video streams are output in a time division manner.

The video signal control portion 120 has a structure such as that shown in FIG. 20, and thus can generate, for example, interpolated unit video such as that shown in FIG. 5 and FIG. 6 and so on. It is needless to say that, as long as the video signal control portion is able to generate interpolated video, the structure of the video signal control portion 120 is not limited to the example shown in FIG. 20.

2. Conclusion

According to the above-described embodiment of the present invention, signals are provided to the image display portion 110 and images are displayed in a time division manner, including cases in which the display periods of the left eye video stream and of the right eye video stream are different with respect to the input signal interval. As a result, it is possible to inhibit increased costs in the manufacture of the shutter glasses 200 and the display device 100, and also to suppress the occurrence of flicker when images are displayed on the image display portion 110.

Note that the series of signal processing described above may be performed by hardware or may be performed by software. When the series of signal processing is performed by software, a storage medium that stores programs, for example, may be built into the liquid crystal display device 100. A central processing unit (CPU), a digital signal processor (DSP) or another control device that is built into the display device 100 may read out the programs and sequentially execute the programs.

It should be understood by those skilled in the art that various modifications, combinations, sub-combinations and alterations may occur depending on design requirements and other factors insofar as they are within the scope of the appended claims or the equivalents thereof.

For example, in the above-described embodiment, the example of a device that displays stereoscopic images is given as the display device 100, but the present invention is not limited to this example. The present invention may also be applied, for example, to a display device that performs multi-view display in which different video is displayed to a plurality of viewers using a time division shutter method. In contrast to a case in which viewers are caused to perceive stereoscopic images, in multi-view display, by controlling the shutters such that an image can only be seen through predetermined shutter glasses during a predetermined period, a plurality of images can be displayed on a single display device.

What is claimed is:

1. A display device comprising:
 a video display portion configured to display video; and
 a video signal control portion configured to perform signal control on an input signal having a plurality of video streams formed of a plurality of chronologically arranged unit videos such that display periods of the plurality of video streams are different from each other with respect to an interval of the input signal that includes the plurality of video streams, sequentially switch in a time division manner the video streams included in the signal controlled input signal, and output the video streams to the video display portion, so as to cause the video display portion to display the plurality of video streams in a time division manner at 120 Hz or more with respect to the input signal having an input frequency value of 24 Hz,
 the plurality of video streams include a left eye video stream and a right eye video stream, in which the left eye video stream has a plurality of left eye unit videos and the right eye video stream has a plurality of right eye unit videos,
 the video streams are caused to be output to the video display portion in a video unit alternating manner such that each two consecutive unit videos include a respective left eye unit video and a respective right eye unit video, and
 the display periods of the left eye video stream and the right eye video stream are caused to be different from each other with respect to the input signal interval, in which the input signal interval is a cycle period associated with the input frequency of the input signal such that the display periods of the left eye video stream and the right eye video stream are different from each other within each said cycle period in a varying manner in which a display period of one of the left eye video stream or right eye video stream is larger than that for the other of the left eye video stream or right eye video stream in one cycle period and smaller than that for the other of the left eye video stream or right eye video stream in another cycle period so as to provide an output frequency of the left eye video stream and the right eye video stream which form the video streams output to the display portion in which the output frequency has a value larger than that of the input frequency.

2. The device according to claim 1,
wherein the video signal control portion includes
an interpolated video generation portion that generates interpolated video from continuous unit videos belonging to a same one of the video streams.

3. The display device according to claim 1,
wherein the video display portion is driven at a drive frequency equal to or less than 260 Hz.

4. A display method comprising:
performing signal control on an input signal such that there is a case in which display periods of a plurality of video streams formed of a plurality of chronologically arranged unit videos are different from each other with respect to an interval of the input signal that includes the plurality of video streams, and performing video signal control such that the video streams included in the signal controlled input signal are sequentially switched and output in a time division manner; and
performing time division display of the video streams on which signal control has been performed,
the video streams being time division displayed at 120 Hz or more with respect to the input signal which has an input frequency value of 24 Hz,
the plurality of video streams include a left eye video stream and a right eye video stream, in which the left eye video stream has a plurality of left eye unit videos and the right eye video stream has a plurality of right eye unit videos,
the video streams are output in a video unit alternately manner such that each two consecutive unit videos include a respective left eye unit video and a respective right eye unit video, and
the display periods of the left eye video stream and the right eye video stream are different from each other with respect to the input signal interval, in which the input signal interval is a cycle period associated with the input frequency of the input signal such that the display periods of the left eye video stream and the right eye video stream are different from each other within each said cycle period in a varying manner in which a display period of one of the left eye video stream or right eye video stream is larger than that for the other of the left eye video stream or right eye video stream in one cycle period and smaller than that for the other of the left eye video stream or right eye video stream in another cycle period so as to provide an output frequency of the left eye video stream and the right eye video stream which form the video streams output to the display portion in which the output frequency has a value larger than that of the input frequency.

5. A non-transitory computer readable storage medium having stored thereon a computer program comprising instructions that when executed command a computer to perform the steps of:

performing signal control on an input signal such that there is a case in which display periods of a plurality of video streams formed of a plurality of chronologically arranged unit videos are different from each other with respect to an interval of the input signal that includes the plurality of video streams, and performing video signal control such that the video streams included in the signal controlled input signal are sequentially switched and output in a time division manner; and
performing time division display of the video streams on which signal control has been performed in the video signal control step,
the video streams being time division displayed at 120 Hz or more with respect to the input signal which has an input frequency value of 24 Hz,
the plurality of video streams include a left eye video stream and a right eye video stream, in which the left eye video stream has a plurality of left eye unit videos and the right eye video stream has a plurality of right eye unit videos,
the video streams are output in a video unit alternately manner such that each two consecutive unit videos include a respective left eye unit video and a respective right eye unit video, and
the display periods of the left eye video stream and the right eye video stream are different from each other with respect to the input signal interval, in which the input signal interval is a cycle period associated with an input frequency of the input signal such that the display periods of the left eye video stream and the right eye video stream are different from each other within each said cycle period in a varying manner in which a display period of one of the left eye video stream or right eye video stream is larger than that for the other of the left eye video stream or right eye video stream in one cycle period and smaller than that for the other of the left eye video stream or right eye video stream in another cycle period so as to provide an output frequency of the left eye video stream and the right eye video stream which form the video streams output to the display portion in which the output frequency has a value larger than that of the input frequency.

6. A stereoscopic display device comprising:
a display portion configured to display video; and
a video signal control portion configured to (i) perform signal control on an input signal comprising a left eye video stream and a right eye video stream and (ii) output the left eye video stream and the right eye video stream to the display portion in an alternating time division manner, so as to cause the video display portion to display the plurality of video streams in a time division manner at 120 Hz or more with respect to the input signal having an input frequency value of 24 Hz and so that display periods of the left eye video stream and the right eye video stream are caused to be different from each other with respect to a cycle period of the input signal associated with the input frequency value.

* * * * *